Sept. 6, 1966  E. J. WALTONEN  3,270,604
FORCE APPLYING FABRICATING DEVICES
Filed July 1, 1964  4 Sheets-Sheet 1
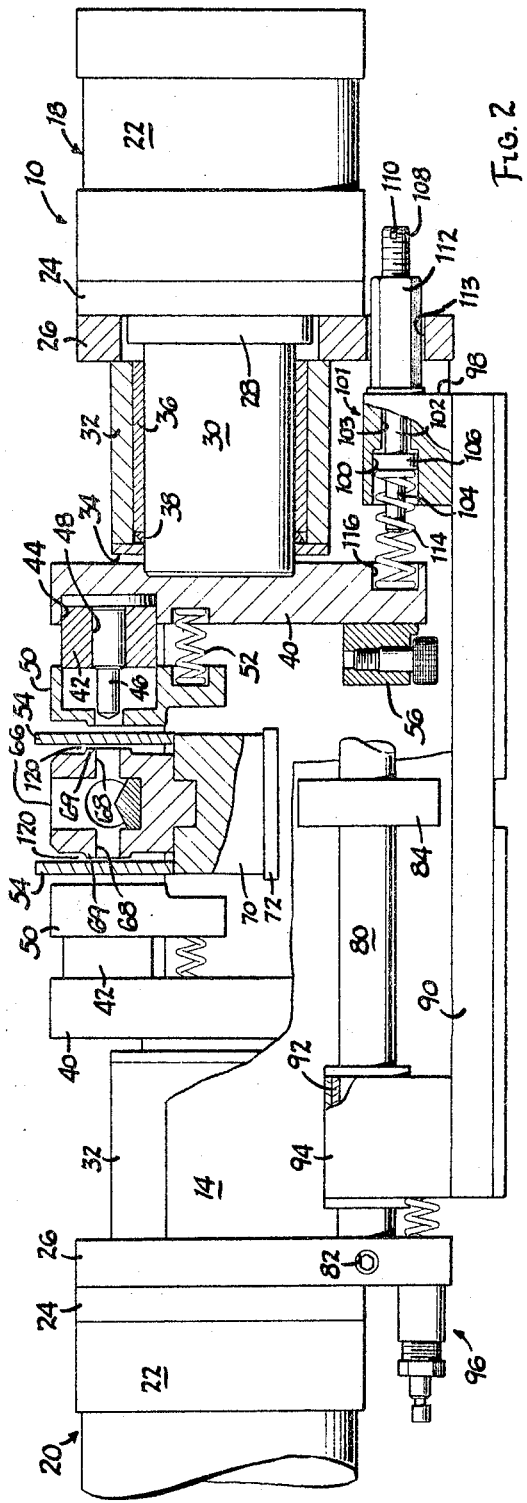
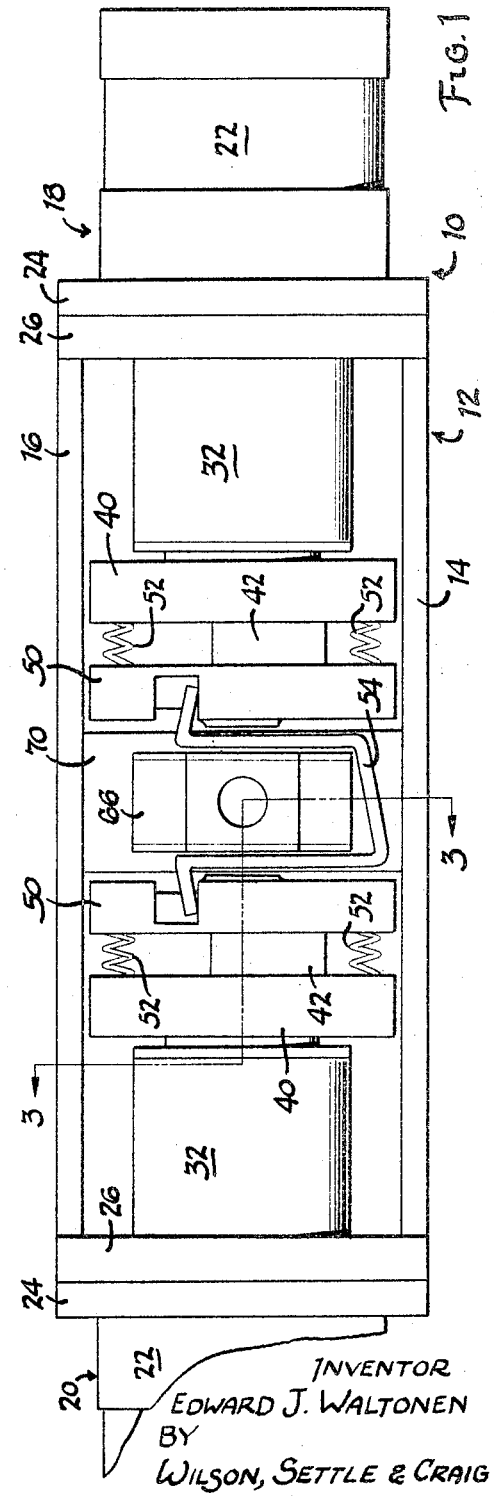
INVENTOR
EDWARD J. WALTONEN
BY
WILSON, SETTLE & CRAIG
ATTORNEYS Sept. 6, 1966 E. J. WALTONEN 3,270,604
FORCE APPLYING FABRICATING DEVICES
Filed July 1, 1964 4 Sheets-Sheet 2

INVENTOR
EDWARD J. WALTONEN
BY
WILSON, SETTLE & CRAIG
ATTORNEYS

Sept. 6, 1966 E. J. WALTONEN 3,270,604
FORCE APPLYING FABRICATING DEVICES
Filed July 1, 1964 4 Sheets-Sheet 4

INVENTOR
EDWARD J. WALTONEN
BY
WILSON, SETTLE & CRAIG
ATTORNEYS

United States Patent Office 3,270,604
Patented Sept. 6, 1966

3,270,604
FORCE APPLYING FABRICATING DEVICES
Edward J. Waltonen, Southfield, Mich., assignor to Wes Industries, Inc., Royal Oak, Mich., a corporation of Michigan
Filed July 1, 1964, Ser. No. 379,541
9 Claims. (Cl. 83—140)

The present invention relates to improvements in force applying apparatus generally used to fabricate various metal or plastic parts, as for example, but not limited to, those parts manufacturable and usable on automobile and like assembly lines. More specifically, this invention embodies single or multiple force applying fabricating apparatus novelly suspended and balanced to reduce workpiece distortion during fabrication to thereby manufacture a finished workpiece of materially improved fabricated alignment. The invention may be used in welding, riveting, punching, piercing, pressing, stamping and like operations.

Previous commercial force applying fabricating apparatus have generally been designed so that a stationary close-fiitting die or like force-resisting element will firmly engage and back up a workpiece in close surface-to-surface contact the instant the workpiece is inserted into the apparatus. Any malfunction existing in the workpiece will cause a mismatch between the workpiece and the stationary close-fitting die, obviating the required surface-to-surface contact therebetween. Consequently, when the force applying element, for example a press ram equipped with a piercing unit, is energized to press against the surface of the workpiece opposite the die element, the workpiece is first deformed or bent by uneven pressures created before it is pierced. The pierced aperture will, accordingly, be misaligned from its predetermined expected position, due to the described distortion of the workpiece during fabrication. Hence, malformed workpieces must be discarded, with great sacrifice in cost, when close tolerance application is required. Otherwise, tolerances on fabricated workpieces are extremely large which, in turn, generates costly problems of assembly when endeavoring to match the workpiece with adjoining component parts.

Accordingly, it is a primary object of the present invention to overcome or substantially alleviate the above described prior art deficiencies by providing an improved force applying apparatus having one or more of the following novel features:

(1) Novel arrangement and operation of parts which materially reduces the workpiece distortion and misalignment during fabrication;

(2) Capable of fabricating workpieces, even when initially malformed, to improved precise tolerances;

(3) Equipped with either single or multiple force applying means for increased finished workpiece production and a longer machine life;

(4) Utilizing an improved, spaced suspension system for floatably suspending the entire fabricating device by pressure-equalizing or balancing means; and (5) Totally automatable and mountable in any horizontal, vertical or inclined position.

An additional object of this invention is to provide a force-applying device having improved features of parts, simplicity, low cost, compact design, wide range of utility, sturdy construction, and long service life.

Other objects of this invention will appear in the following description and appended claims, reference being had to the accompanying drawings forming a part of this specification wherein like reference characters designate corresponding parts in the several views.

In the drawings:

FIGURE 1 is a plan view of one presently preferred embodiment of the present invention, depicting a dual piercing apparatus with oppositely disposed presses;

FIGURE 2 is a side elevation, shown partly in broken away cross-section, further illustrating the apparatus of FIGURE 1;

The following will describe the present invention with reference to its use as a piercing unit, but it is to be appreciated that the invention is of broader scope, being utilizable in welding, riveting, pressing, stamping and other like operations.

*General description—Dual piercing embodiment*

Figure 3:
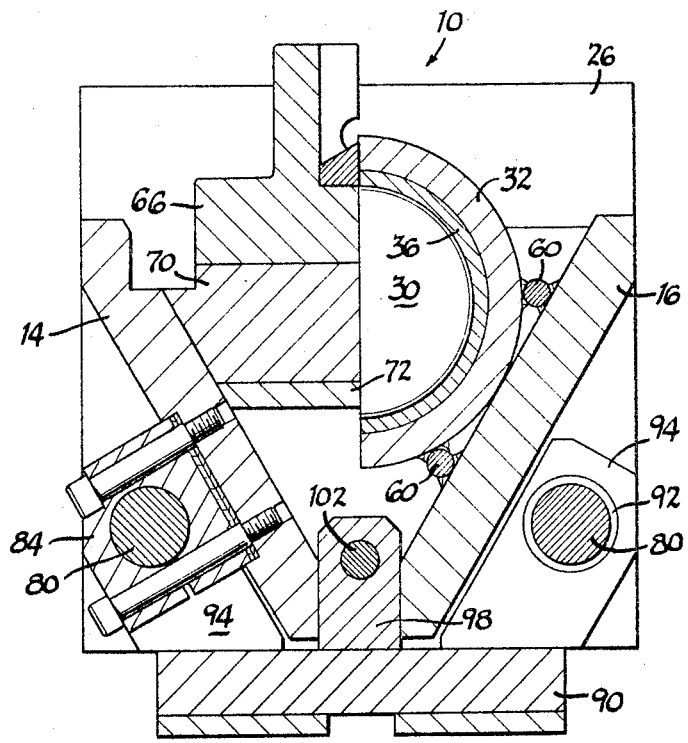
FIGURE 3 is a transverse cross-section of the apparatus of FIGURE 1, taken along line 3—3 thereof.

Referring now in greater detail to the embodiment shown in FIGURES 1 through 3, there is shown a dual piercing unit 10 mounted in a V-shaped carriage or frame 12 which is composed of identical opposite-hand side members 14 and 16. Mounted at the end of frame 12, by bolt or other like fastening means, are oppositely disposed press assemblies 18 and 20. Since press assemblies 18 and 20 are identical except for being opposite-hand, only one press assembly will be structurally described. Each of the press assemblies 18 and 20 comprises an end cylinder 22 and apertured fastening flange plates 24 and 26, with which the press units are fastened to the frame 12 in fixed relationship.

Piston 28 reciprocably moves in cylinder 22, responsive to energization and de-energization thereof and may be powered by an air, oil or like fluid prime mover (not shown). Integral with and extending from the piston 28 is a piston rod 30 housed within a sleeve 32 which is fastened, as for example by welding, to plate 26 and end plate 34. As seen from an examination of FIGURE 3, the sleeve 32 is fixed on the frame 12 by means of rods 60, welded therebetween. Interposed between the sleeve 32 and the piston rod 30 is a seal guard ring 38 and bushing 36, of conventional appropriate size and material.

A ram 40, of standard design, is fixed in a conventional manner, as for exampe by lock screws, to the exposed end of the piston rod 30 to reciprocate therewith responsive to energizing and de-energizing of the cylinder 22. Punch retainer 42 is rigidly carried by the ram 40 in a recess 44, preferably being bolt secured thereto. Punch 46, in turn, is carried by the punch retainer 42 in aperture 48 in a conventional and well known manner.

Pressure pad 50 is mounted upon the face of the ram 40 opposite piston rod 30 by means of four spaced snap-ring secured springs 52 which permit relative movement between pressure pad 50 and ram 40 once pad 50 has engaged the surface of the workpiece. As the ram 40 and punch 46 are withdrawn following fabrication of the workpiece, the pad 50 is urged in a direction opposite to that movement to facilitate ease of stripping the punch 46 from the workpiece 54. Pressure pad 50 may be so formed as to include one or more apertures or recesses or the like for the purpose of fitting assorted workpieces to be fabricated.

Anti-rotation fixture 56 is fixed at the bottom of ram 40, preferably by welding. Fixture 56 is preferably a McGill anti-rotate device which rotatably reciprocably moves in a close tolerance female groove situated at the base of the frame 12 between side members 14 and 16. By this, rotation of the piston 30 and associated components is prohibited and rectilinear reciprocal movement thereof is assured.

Interposed between the pressure pad 50 of the press assembly 18 and the pressure pad 50 of press assembly 20 is a two-directional piercing die 66, having oppositely disposed apertures 68 and workpiece abutment faces 69 to receive punches 46 to thereby pierce workpiece 54. Keyed support 70 non-rotatably carries die 66 and is, in turn, supported rigidly by base plate 72. Base plate 72, in turn, is attached to frame 12, as for example by welding, at sides 14 and 16 so that in operation no relative movement between the combination of die 66, support 70 and base plate 72 and frame 12 is possible.

The present invention features spaced, aligned support shafts 80 which are rigidly attached to flange fastening plates 26 of presses 18 and 20, as for example by Allenhead screw 82 (see FIGURE 2). Shafts 80 are intermediately supported and clamped by bracket 84 which is preferably bolt fastened in appropriate recesses in frame sides 14 and 16 (see FIGURE 3).

Support shafts 80 floatably suspend the entire heretofore described piercing unit, including frame 12, press assemblies 18 and 20, die 66 and its supporting structure, for relative movement with respect to a fixed datum, as hereinafter to be described. This movement is confined to reciprocal rectilinear movement, rotation thereof being prevented by reason of spaced supporting shafts 80.

The entire structure, carried by support shafts 80, rests upon supporting base 90, shafts 80 being reciprocably movably carried in support bushings 92 housed within support extensions 94 of the base 90. In the present embodiment there are provided four extensions 94, two for each support rod 80 located near their terminal ends, as shown in the lower lefthand portion of FIGURE 2. Support base 90 is normally stationarily mounted, being mountable horizontally below or above, or to one side of the piercing apparatus. Base 90 may also be inclined or vertically oriented, as desired. When supporting base 90 is mounted in a vertical or in an inclined attitude, gravity compensating fixture 96 is biasedly attached between fastening plate 26 and support base 90 to balance and centrally orient the die 66 against the force of gravity.

Integrally located at each end of the support base 90 is one adjustable balancing spring assembly 101 which includes a spring support 98 containing variable diameter aperture 100. Variable aperture 100 receives a stud 102 adjacent bushing 103. The stud 102 includes extension 104 backed by flange 106 at one end and a threaded extension 108 equipped with slot adjustment 110 for moving stud 102 relative to nut 112 which threadedly mates with extension 108 adjacent balancing spring support 98. Nut 112 is fixed in aperture 113 of fastening plate 26. Within the structural limits provided, upon rotation of extension 108 stud 102 will move the extension 104 to the right or left, as seen in FIGURE 2, depending on the direction of rotation. Concentrically surrounding extension 104 is compression spring 114, one end of which is received in the larger diameter portion of aperture 100 to bear against flange 106 and the other end being housed in recess 116 of ram 40 to compressively urge ram 40 away from spring support 98. By adjustment of right and left balancing spring assemblies 101 through rotation of extension 108, the amount of compression in balancing springs 114 may be essentially balanced or equalized prior to operation of dual piercing unit 10 so as to essentially center the die 66 between opposed pressure pads 50.

Consequently, in any installed position, dual piercing unit 10 is floatably suspended from the supporting base 90 upon spaced aligned support shafts 80 in pressure balanced relation by means of proper adjustment of compression of springs 114 of balancing spring assemblies 101 so that dual piercing die 66 is appropriately centered.

*Operation of the dual piercing embodiment*

By reason of the heretofore described floatingly suspended centrally balanced dual piercing unit, it is possible to provide a significant, increased rate of production by accurately fabricating two portions of a given workpiece in rapid succession by sequential actuation of the press units 18 and 20. Workpieces which have been partially malformed prior to the fabrication stage may also be accurately fabricated by the present invention since workpiece distortion and misalignment is significantly alleviated by permitting the workpiece, as for example, U-shaped workpiece 54 of FIGURES 1 and 2, to be loosely inserted about die 66 in spaced relation. Spaces 120 between abutment faces 69 of loose-fitting die 66 and workpiece 54 may be on the order of one-sixteenth of an inch or larger.

In actual operation, workpiece 54 is inserted manually or automatically about die 66 in the heretofore described spaced relation. Thereafter, for example, press 18 is actuated by energization of cylinder 22 to cause piston rod 30 and ram 40 with retained punch 46 to move in a leftward direction, as viewed in FIGURE 2.

This initial and continuing leftward movement disturbs the pressure balance between right and left balancing spring assemblies 101, inasmuch as right ram 40 is moving away from right spring support 98, thereby reducing the amount of compression in right spring 114. At the same time, since there is no relative movement between left ram 40 and spring support 98, the compression in the left spring 114 remains unchanged and is, therefore, greater than the compression of right spring 114. Accordingly, the entire dual piercing unit 10, including the frame 12, presses 18 and 20 and particularly piercing die 66, will move toward the right, in a direction opposed to the movement of right piston rod 30, ram 40 and retained punch 46, to cause right abutment surface 69 of the die 66 to firmly engage and back up the portion of workpiece 54 associated therewith, all due to the greater spring force presently existing in left compression spring 114.

Right punch 46, as urged by right ram 40 and piston rod 30, moves leftward with right pressure pad 50, causing right pressure pad 50 to firmly abut the opposed surface of workpiece 54. Thereafter, pressure pad 50 remains in stationary position while right ram 40, with punch 46, continues leftward, resulting in compression of the four springs 52. Subsequently, right punch 46 pierces workpiece 54 in the appropriately aligned position and is retracted from right aperture 68 by de-energization of cylinder 22. As punch 46 is withdrawn from workpiece 54, springs 52 urge right pressure pad 50 in continued surface-to-surface contact with workpiece 54 to aid in stripping punch 46 from the material.

Press unit 18 returns essentially to its initial at-rest position, restoring the balance between right and left compression springs 114 to again center die 66 momentarily.

Immediately thereafter, press 20 may be actuated by energization of left cylinder 22 resulting in rightward movement of left piston rod 30 and ram 40 with punch 46. This again upsets the compression balance between right and left springs 114, resulting in a greater compression in right-hand spring 114, thereby causing the floatably suspended dual piercing unit 10 to move leftward. Consequently, left abutment face 69 of die 66 firmly abuts and backs up the portion of workpiece 54 associated therewith following which left pressure pad 50 abuts the opposing surface of workpiece 54 and punch 46 pierces, in accurate alignment, a second hole in workpiece 54.

Following this, press assembly 20 is returned to its initial at-rest position, left pressure pad 50 assisting in stripping left punch 46 from workpiece 54 as hereinbefore described in connection with right pressure pad 50. Returning of the press 20 to its initial at-rest position restores balance between right and left compression springs 114, thereby restoring the die 66 to its initial centered position so as to be spaced from workpiece 54 by essentially the distance illustrated as spaces 120 (FIGURE 2). Thereafter, workpiece 54 is automatically or manually withdrawn as a finished fabricated workpiece following which additional workpieces may be inserted and fabricated in the manner described.

If desired, only one of the presses 18 and 20 may be utilized in fabricating a given workpiece, depending upon the nature of the fabrication requirements.

It is to be appreciated that while the dual operation features of the present invention have been described in conjunction with the dual piercing unit embodiment 10, that force applying punch 46 and force resisting die 66 may be replaced by any known or subsequently developed force applying and force resisting means, respectively, to thereby rivet, press, stamp or perform like operations by means of the present invention. Furthermore, punches 46, pressure pads 50 and die 66 may be replaced by conductive force applying and force resisting members appropriately electrically connected to a source of potential in a well known manner and, as such, be utilized as resistance welding apparatus.

*General description—Single piercing embodiment*

Figure 4:
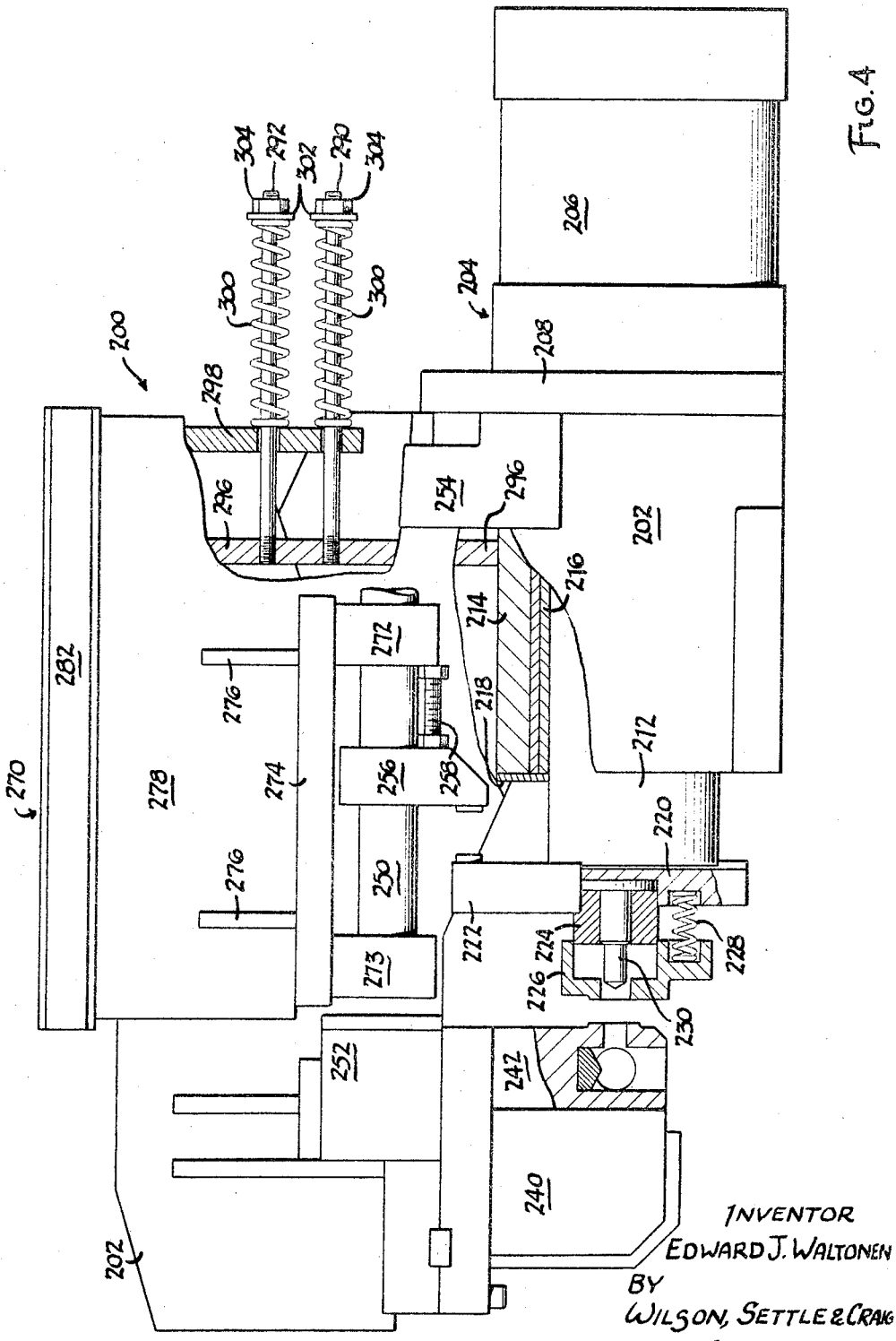
FIGURE 4 is a partially broken away side elevation of another presently preferred embodiment of this invention showing a single piercing apparatus.
Figure 5:
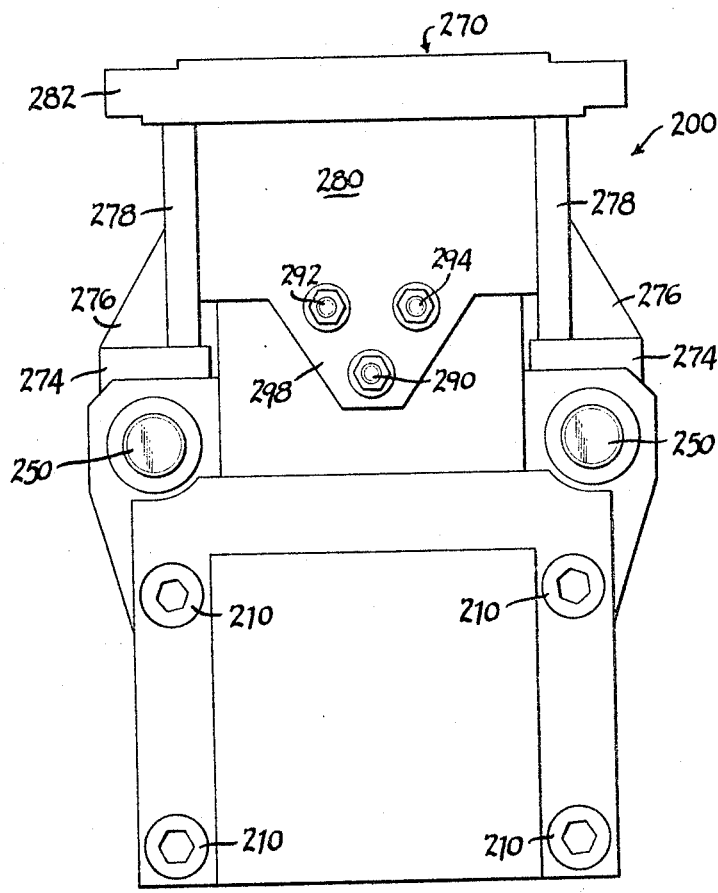
FIGURE 5 is an end elevation of the apparatus of FIGURE 4.

Referring now to FIGURES 4 and 5 in detail, there is shown a single floatably suspended piercing unit 200 which operates in a manner analogous to the operation of the previously described dual piercing unit 10.

The construction of single piercing unit 200 consists of an irregularly shaped frame or carriage 202 upon which press assembly 204 is rigidly mounted. Press assembly 204 conventionally includes cylinder 206 and fastening plate 208 with which press 204 is rigidly fastened to frame 202, as, for example, by means of Allen-head screws 210. Piston rod 212, preferably of rectangular cross-section to prevent piston rotation, extends through sleeve 214, being separated therefrom by a bushing 216 and end plate 218. Carried upon the exposed end of piston rod 212 is standard ram 220 upon which is mounted ram-stop 222 and punch retainer 224 by conventional and well known fasteners. Additionally, pressure pad 226 is spring mounted to the face of ram 220 by means of four springs 228, and is provided with an aperture to permit punch 230 to move therethrough during actuation of the press assembly 204. Rigidly depending from the frame 202 is die support 240 to which die 242 is rigidly attached, in any desired manner, so as to be cooperable with punch 230 to therewith fabricate a workpiece, as desired.

Single piercing unit 200, including press 204, frame 202, die support 240 and die 242, is essentially unitarily suspended in floatable pressure balanced relation upon a pair of aligned, spaced support shafts 250. Each support shaft is rigidly fixed at its terminal end to frame brackets 252 and 254, as, for example, by set-screws. One or both of support shafts 250 is provided with a stop 256 which is releasably rigidly fixed to and travels with shaft 250 by bolt or like means, being designed to engage ram stop 222 at a preselected position. Shaft stop 256 carries with it adjustable abutment pin 258. By utilization of shafts 250, rotation of press 204 and the remaining suspended structure is obviated to insure rectilinear reciprocable movement of the suspended structure, as hereinafter to be explained.

Support base 270 suspendingly supports single piercing unit 200 by means of support shafts 250 through bushing carrying support arms 272 and 273. Support 272 is designed to abut, at a predetermined position, the right end of adjustable abutment pin 258 carried by shaft stop 256. Support base 270 also includes horizontal side plates 274, triangular brackets 276, vertical side plates 278, vertical end plate 280 and top horizontal member 282, all of which are rigidly secured together as, for example, by welding.

Single piercing unit 200 is floatably suspended from support base 270 on support shafts 250 by means of, in this instance, three spring biased threaded rods 290, 292 and 294. Threaded rods 290, 292, 294 are fixedly secured in plate 296 as, for example, by threaded connection. Plate 296 is rigidly fastened to and moves with frame 202, being fastened as, for example, by welding, so as to move therewith.

Rods 290, 292 and 294 pass through oversized apertures in projection 298 of vertical end plate 280. Concentrically positioned about each rod 290, 292, 294 are compression springs 300, which are biased between end plate extension 298 and washers 302 which, in turn, are backed up by nuts 304 threaded upon the illustrated right end of rods 290, 292 and 294. By rotation of nuts 304 the magnitude of compression in springs 300 may be varied, as desired.

*Operation of the single piercing embodiment*

Springs 300, mounted on rods 290, 292 and 294, are pre-compressed by piston 212 through plate 296 and rods 290, 292, 294 beyond the magnitude of compression induced upon springs 300 by adjustment of nuts 304, for purposes subsequently to be explained, a desired amount when piston 212 is in its fully retracted at-rest position.

To fabricate a workpiece by use of single piercing unit 200, the workpiece is manually or automatically inserted intermediate pressure pad 226 and die 242 in loose-fitting spaced relation to both. Press assembly 204 is actuated by energization of cylinder 206 causing frame 202, with cylinder 206, sleeve 214, die support 240, and die 242 to move rightward with reference to FIGURE 4 while piston rod 212 and ram 220, with punch 230, remain stationary. This gradually reduces the pre-compression load upon springs 300 and simultaneously will bring die 242 into surface abutment with the inserted workpiece preparatory to fabrication.

When the frame 202 and supported structure have moved toward the right a predetermined adjustable distance, such that separation between ram stop 222 and shaft stop 256 is impending, springs 300 are at their normal compression load, free of any piston-induced pre-compression. Frame 202, press 204, die support 240 and die 242 then cease their rightward movement and become stationary. Thereafter, ram stop 222 separates from the shaft stop 256 and moves punch retainer 224, press pad 226 and punch 230 toward the left, to engage pressure pad 226 with the workpiece to be fabricated. Punch 230 is then driven through the workpiece in precise, aligned relation by means of ram 222 causing compression of springs 228 between ram 222 and pressure pad 226.

Subsequently, cylinder 206 is de-energized to retract punch 230 from its extended fabricating position to be stripped from the workpiece by aid of pressure pad 226, as earlier described, permitting pressure pad 226, punch 230, punch retainer 224, ram 220 and piston rod 212 to return to the right a distance sufficient to cause impending contact between ram stop 222 and shaft stop 226.

Ram 220 is prevented from further rightward movement when stop 222 firmly abuts against stop 256 which, in turn, is prevented from further movement by reason of abutment 258 bearing against stationary arm 272. At this point, ram 220 becomes stationary and frame 202, with piston sleeve 214, cylinder 206, die support 240 and die 242 move leftward, the remaining distance sufficient to fully retract piston rod 212 to its initial at-rest position. This again causes the aforesaid piston-induced pre-compression to be exerted upon springs 300.

The workpiece is then withdrawn, automatically or manually, and additional workpieces may, if desired, be inserted and fabricated in like manner.

The relative working position of members 222, 256, 258 and 272 may be varied by adjusting the location of shaft stop 256 upon shaft 250 and by extending or shortening the exposed length of abutment pin 258 to provide the magnitude of die and punch movement desired for any given workpiece.

It is again to be understood that single piercing unit 200 is merely representative of one embodiment of the present invention. This should not be interpreted as restricting the scope of this invention since the invention also includes utilization of other force applying and force resisting elements in addition to those described in conjunction with single piercing unit 200 to perform riveting, welding, pressing, stamping and like operations.

The invention may be embodied in other specific forms without departing from the spirit or essential characteristics thereof. The present embodiments are, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed and is desired to be secured by United States Letters Patent is:

1. In a force applying fabricating device, frame means, workpiece fabricating means carried by said frame means and including force applying means and force resisting means spaced from said force applying means for cooperation therewith to fabricate a workpiece; spaced shaft means unitarily supporting said frame means and said workpiece fabricating means; suspension means upon which the combination of said spaced shaft means, said frame means and said workpiece fabricating means are suspended for relative movement thereto; resilient biasing means interposed between said suspension means and the combination of said workpiece fabricating means, said frame means and said spaced shaft means urging said force resisting means in a direction opposite to the direction of movement of said force applying means upon actuation thereof; whereby upon actuation of said force applying means to forcibly engage the workpiece between said force resisting means and said force applying means, the combination of said workpiece fabricating means, said frame means and said shaft means move responsive to said resilient biasing means in substantial unison relative to said suspension means in a pressure balancing manner to contact the workpiece first by said force resisting means and second by said force applying means to thereby manufacture a finished workpiece of improved precision.

2. A device as defined in claim 1 wherein said device may be vertically operably oriented and wherein said resilient biasing means includes gravity compensating means of orienting and balancing said device against the force of gravity.

3. A device as defined in claim 1 wherein said forming means and said workpiece are loose-fitted in spaced relation when said device is in the inactive position.

4. A device as defined in claim 3 wherein said resilent basing means includes means which urge the combination of said frame means, said workpiece fabricating means and said spaced shaft means in a direction opposite to the movement of said force applying means when said force applying means is actuated, to thereby cause said force resisting means to firmly abut said workpiece during fabrication.

5. A device as defined in claim 1 wherein said forming means is a loose-fit die member having a workpiece abutment surface spaced at least one-sixteenth of an inch from the workpiece when said device is in the inactive position.

6. A device as defined in claim 1 wherein said force applying means includes at least one press having a fluid actuated piston contained within a cylinder and carrying a ram fitted with a force applying element and further including an antirotation fixture to prevent piston rotation during operation of said device.

7. A device as defined in claim 1 wherein said workpiece fabricating means includes a second force applying means and said resilient biasing means include oppositely disposed compression spring means interposed between said suspension means and said force applying means and further including adjusting means for varying the magnitude of compression of said spring means for balanced orientation when said device is in the inactive position.

8. In a force applying fabricating device, frame means, workpiece fabricating means carried by said frame means and including at least two oppositely disposed and oppositely actuatable force applying means and force resisting means interposed between and normally spaced from said force applying means for cooperation therewith to fabricate a workpiece, means unitarily supporting said frame means and said workpiece fabricating means, suspension means suspending the combination of said supporting means, said frame means and said workpiece fabricating means for relative movement thereto, each of said force applying means including a cylinder and a fluid-operated movable piston therefor, and first and second resilient biasing means interposed respectively between said suspension means and said pistons, said resilient biasing means acting oppositely in balanced relation to each other and urging said force resisting mean in a direction opposite to the direction of movement of the respective piston upon actuation thereof whereby said pistons may be actuated seriatim to forcibly engage the workpiece between said force resisting means and said force applying means at which time said fabricating means, said frame means and said supporting means move in substantially floating unison relative to said suspension means to alleviate normal incidence of forced distortion and misalignment of said workpiece to thereby manufacture a finished workpiece of improved precision.

9. In a workpiece engaging pressure device, the combination of a pair of parallel spaced shafts, means supporting said shafts for movement axially thereof relative to said support means, a frame affixed to said shafts for movement therewith, force resisting means affixed to said frame, force applying means supported by said frame including a pressure member spaced from and cooperable with said force resisting means to fabricate a workpiece when placed between said pressure member and said force resisting means, said force applying means further including a piston connected to said pressure member and a cylinder for said piston operable to advance said piston and said pressure member towards said force resisting means and to retract the same away from said force resisting means, and resilient biasing means urging the combination of said shaft, said frame, and said force resisting means in a direction opposite to the direction of advancing movement of said piston, the latter combination moving in response to the actuation of said cylinder to advance said piston to thereby move said force resisting means into contact with said workpiece, said pressure member then applying force to said workpiece to fabricate the same.

References Cited by the Examiner

UNITED STATES PATENTS

| | | | |
|---|---|---|---|
| 642,631 | 2/1900 | Rothe | 83—623 |
| 2,594,506 | 4/1952 | Sharpe | 83—623 X |

ANDREW R. JUHASZ, *Primary Examiner.*